US008862322B2

(12) United States Patent
Kariatsumari et al.

(10) Patent No.: US 8,862,322 B2
(45) Date of Patent: *Oct. 14, 2014

(54) MOTOR CONTROL UNIT AND VEHICLE STEERING APPARATUS

(75) Inventors: Yuji Kariatsumari, Yamatotakada (JP); Hayato Komatsu, Ama-gun (JP)

(73) Assignee: JTEKT Corporation, Osaka-shi (JP)

( * ) Notice: Subject to any disclaimer, the term of this patent is extended or adjusted under 35 U.S.C. 154(b) by 271 days.

This patent is subject to a terminal disclaimer.

(21) Appl. No.: 12/823,573

(22) Filed: Jun. 25, 2010

(65) Prior Publication Data

US 2011/0001441 A1 Jan. 6, 2011

(30) Foreign Application Priority Data

Jul. 6, 2009 (JP) ................................. 2009-159897

(51) Int. Cl.
| | |
|---|---|
| B62D 5/04 | (2006.01) |
| B62D 5/14 | (2006.01) |
| H02P 21/04 | (2006.01) |
| H02P 21/00 | (2006.01) |

(52) U.S. Cl.
CPC ............ *H02P 21/0003* (2013.01); *H02P 21/04* (2013.01); *B62D 5/046* (2013.01)
USPC ................................. 701/41; 180/443; 318/3

(58) Field of Classification Search
CPC ..... B62D 5/046; B62D 5/0463; B62D 5/0472
USPC .......... 180/412–423, 443–447; 318/799, 809, 318/432–434; 701/41–42
See application file for complete search history.

(56) References Cited

U.S. PATENT DOCUMENTS

| | | | |
|---|---|---|---|
| 5,513,720 A | 5/1996 | Yamamoto et al. | |
| 5,568,389 A | 10/1996 | McLaughlin et al. | |

(Continued)

FOREIGN PATENT DOCUMENTS

| | | |
|---|---|---|
| EP | 1 487 098 A1 | 12/2004 |
| EP | 1 955 926 A2 | 8/2008 |

(Continued)

OTHER PUBLICATIONS

U.S. Appl. No. 12/943,514, filed Nov. 10, 2010.

(Continued)

*Primary Examiner* — Helal A Algahaim
*Assistant Examiner* — Charles J Han
(74) *Attorney, Agent, or Firm* — Oliff PLC

(57) ABSTRACT

A motor control unit controls a motor including a rotor and a stator facing the rotor. A current drive unit drives the motor at an axis current value of a rotating coordinate system that rotates in accordance with a control angle that is a rotational angle used in a control. An addition angle calculation unit calculates an addition angle to be added to the control angle. A control angle calculation unit obtains, at every predetermined calculation cycle, a present value of the control angle by adding the addition angle that is calculated by the addition angle calculation unit to an immediately preceding value of the control angle. An angular speed calculation unit calculates an angular speed of the rotor. An addition angle correction unit corrects the addition angle based on the angular speed calculated by the angular speed calculation unit. A filtering unit filters the angular speed calculated by the angular speed calculation unit.

16 Claims, 10 Drawing Sheets

(56) References Cited

U.S. PATENT DOCUMENTS

| | | | |
|---|---|---|---|
| 5,928,298 | A | 7/1999 | Matsuoka et al. |
| 6,364,051 | B1 | 4/2002 | Kada et al. |
| 6,396,229 | B1 | 5/2002 | Sakamoto et al. |
| 6,397,969 | B1 | 6/2002 | Kasai et al. |
| 6,781,333 | B2 | 8/2004 | Koide et al. |
| 7,076,340 | B1 | 7/2006 | Inazumi et al. |
| 2002/0026270 | A1* | 2/2002 | Kurishige et al. ............... 701/41 |
| 2002/0180402 | A1* | 12/2002 | Koide et al. ................... 318/727 |
| 2003/0030404 | A1 | 2/2003 | Iwaji et al. |
| 2004/0267421 | A1 | 12/2004 | Eskritt et al. |
| 2005/0029972 | A1 | 2/2005 | Imai et al. |
| 2005/0257994 | A1* | 11/2005 | Fujita ............................ 180/446 |
| 2005/0273236 | A1 | 12/2005 | Mori et al. |
| 2006/0086561 | A1 | 4/2006 | Hidaka |
| 2006/0090954 | A1 | 5/2006 | Sugitani et al. |
| 2006/0125439 | A1 | 6/2006 | Ajima et al. |
| 2007/0040528 | A1 | 2/2007 | Tomigashi et al. |
| 2007/0229021 | A1 | 10/2007 | Yoshida et al. |
| 2007/0273317 | A1 | 11/2007 | Endo et al. |
| 2007/0284181 | A1 | 12/2007 | Muranaka |
| 2008/0035411 | A1* | 2/2008 | Yamashita et al. ............ 180/443 |
| 2008/0047775 | A1 | 2/2008 | Yamazaki |
| 2008/0128197 | A1 | 6/2008 | Kawaguchi et al. |
| 2008/0201041 | A1* | 8/2008 | Jiang .............................. 701/42 |
| 2009/0069979 | A1 | 3/2009 | Yamashita et al. |
| 2009/0240389 | A1* | 9/2009 | Nomura et al. ................. 701/29 |
| 2010/0057300 | A1 | 3/2010 | Nishiyama |
| 2010/0094505 | A1 | 4/2010 | Kariatsumari et al. |
| 2010/0198462 | A1 | 8/2010 | Shinoda et al. |
| 2010/0263709 | A1 | 10/2010 | Norman et al. |
| 2011/0035114 | A1* | 2/2011 | Yoneda et al. .................. 701/42 |
| 2012/0080259 | A1 | 4/2012 | Ueda et al. |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-76960 | 3/1998 |
| JP | A-10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A 2003-182620 | 7/2003 |
| JP | A 2007-53829 | 3/2007 |
| JP | A 2007-267549 | 10/2007 |
| JP | A 2008-24196 | 2/2008 |
| JP | A 2008-087756 | 4/2008 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

U.S. Appl. No. 13/685,152, filed Nov. 26, 2012.
U.S. Appl. No. 12/696,604, filed Jan. 29, 2010.
U.S. Appl. No. 12/945,101, filed Nov. 12, 2010.
U.S. Appl. No. 12/946,187, filed Nov. 15, 2010.
U.S. Appl. No. 13/205,138, filed Aug. 8, 2011.
U.S. Appl. No. 12/997,168, filed Dec. 9, 2010.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Feb. 12, 2014 Office Action issued in U.S. Appl. No. 12/945,101.
Nov. 28, 2013 Office Action issued in Japanese Patent Application No. 2009-258962 (with translation).
Jul. 19, 2013 Office Action issued in U.S. Appl. No. 12/945,101.
Mar. 26, 2013 Office Action issued in U.S. Appl. No. 12/945,101.
Dec. 11, 2012 Office Action issued in U.S. Appl. No. 12/945,101.
Aug. 9, 2012 Office Action issued in U.S. Appl. No. 12/945,101.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).
Feb. 10, 2014 Office Action issued in U.S. Appl. No. 12/943,514.
Sep. 10, .2013 Office Action issued in U.S. Appl. No. 12/943,514.
Mar. 22, 2013 Office Action issued in U.S. Appl. No. 12/943,514.
Aug. 31, 2012 Office Action issued in U.S. Appl. No. 12/943,514.
Extended European Search Report issued in European Patent Application No. 10191142.8 dated Jun. 8, 2011.

* cited by examiner

MOTOR CONTROL UNIT AND VEHICLE STEERING APPARATUS

INCORPORATION BY REFERENCE

The disclosures of Japanese Patent Application No. 2009-159897 filed on Jul. 6, 2009 including the specification, drawings and abstract, is incorporated herein by reference in their entireties.

BACKGROUND OF THE INVENTION

1. Field of the Invention

The invention relates to a motor control unit used to drive a brushless motor and a vehicle steering apparatus using the same.

2. Description of the Related Art

A brushless motor may be used as a drive source for, for example, a vehicle steering apparatus. An example of a vehicle steering apparatus is an electric power steering apparatus. A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

US Patent Application Publication No. 2007/0229021 A1 describes a sensorless drive method for driving a brushless motor without using a rotational angle sensor. According to the sensorless drive method, the induced voltage that varies depending on the rotational speed of a rotor is estimated in order to estimate the phase of a magnetic pole (electrical angle of the rotor). When the rotor is at a standstill or rotating at a considerably low speed, it is not possible to estimate induced voltage. Therefore, the phase of the magnetic pole is estimated by another method. More specifically, a sensing signal is input in a stator, and a response of the motor to the sensing signal is detected. Then, the rotational position of the rotor is estimated based on the response of the motor.

SUMMARY OF THE INVENTION

It is an object of the invention to provide a motor control unit that controls a motor according to a new control method that does not require a rotational angle sensor, and a vehicle steering apparatus that uses such motor control unit.

An aspect of the invention relates to a motor control unit that controls a motor including a rotor and a stator facing the rotor. A current drive unit drives the motor at an axis current value of a rotating coordinate system that rotates in accordance with a control angle that is a rotational angle used in a control. An addition angle calculation unit calculates an addition angle to be added to the control angle. A control angle calculation unit obtains, at every predetermined calculation cycle, a present value of the control angle by adding the addition angle that is calculated by the addition angle calculation unit to an immediately preceding value of the control angle. An angular speed calculation unit calculates an angular speed of the rotor. An addition angle correction unit corrects the addition angle based on the angular speed calculated by the angular speed calculation unit. A filtering unit filters the angular speed calculated by the angular speed calculation unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
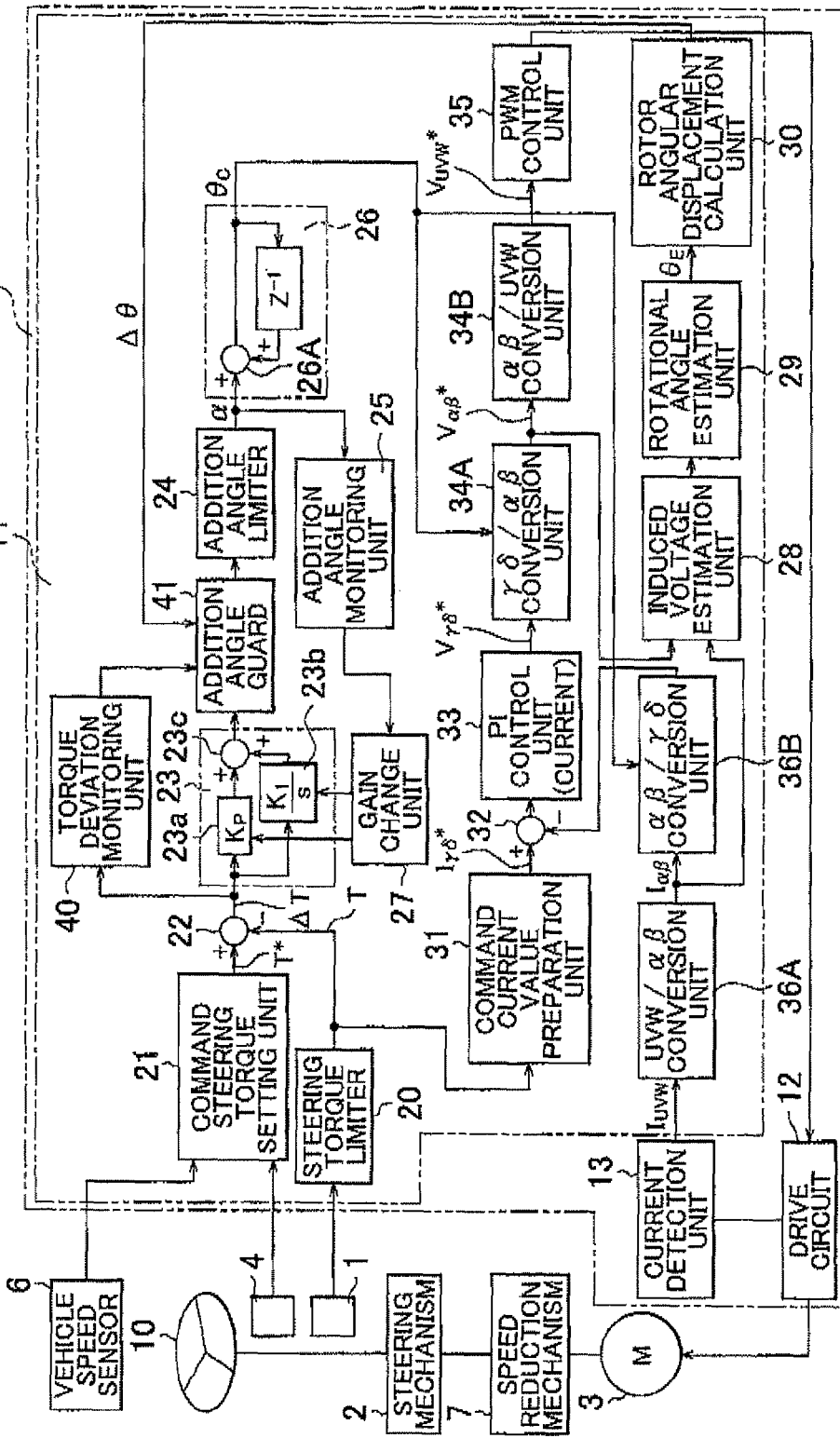
FIG. 1 is a block diagram illustrating the electrical configuration of an electric power steering apparatus that includes a motor control unit according to a first embodiment of the invention.

Hereafter, example embodiments of the invention will be described with reference to the accompanying drawings. FIG. 1 is a block diagram illustrating the electrical configuration of an electric power steering apparatus (an example of a vehicle steering apparatus) that includes a motor control unit according to a first embodiment of the invention. The electric power steering apparatus includes a torque sensor 1 that detects the steering torque T that is applied to a steering wheel 10 that serves as an operation member used to steer a vehicle, an electric motor 3 (brushless motor) that applies a steering assist force to a steering mechanism 2 of the vehicle via a speed reduction mechanism 7, a steering angle sensor 4 that detects the steering angle that is the rotational angle of the steering wheel 10, a motor control unit 5 that controls driving of the motor 3, and a vehicle speed sensor 6 that detects the speed of the vehicle in which the electric power steering apparatus is mounted. The steering mechanism 2 is a drive target that is driven by the motor 3.

The motor control unit 5 controls driving of the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

Figure 2:
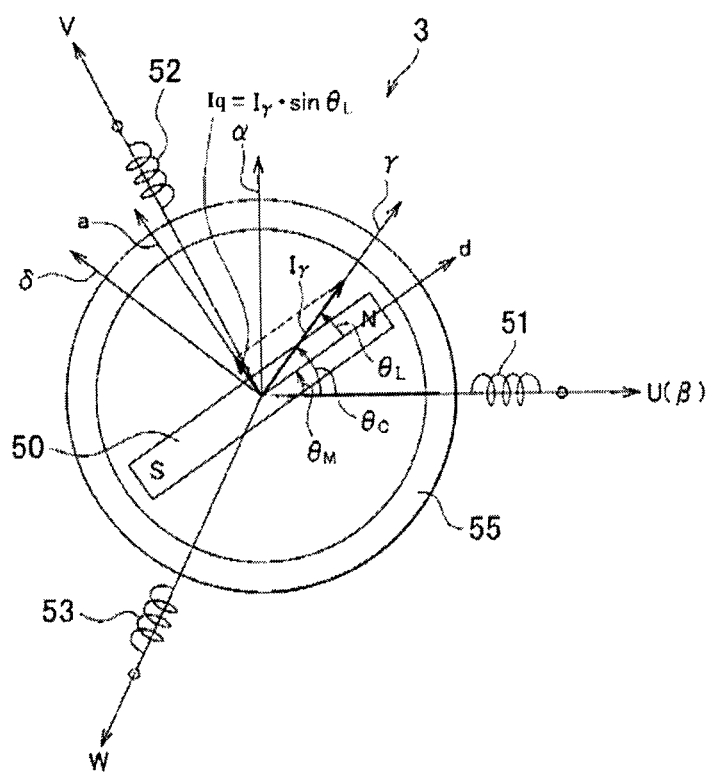
FIG. 2 is a view illustrating the configuration of a motor.

In the first embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) θM of the rotor 50 is a rotational angle of the d-axis with respect to the U-axis. The dq coordinate system is an actual rotating coordinate system that rotates in accordance with the rotor angle θM. With the use of the rotor angle θM, coordinate conversion may be made between the UVW coordinate system and the dq coordinate system.

In the first embodiment, the control angle θC that indicates the rotational angle used in the control is employed. The control angle θC is an imaginary rotational angle with respect to the U-axis. An imaginary two-phase rotating coordinate system (γδ coordinate system: hereafter, referred to as "imaginary rotating coordinate system". Hereafter, the coordinate axis of the imaginary rotating coordinate system will be referred to as "imaginary axis". Also, the axis current value of the imaginary axis will be referred to as "imaginary axis current value".), where the imaginary axis that forms the control angle θC with the U-axis is used as the γ-axis, and the axis that is advanced 90 degrees from the γ-axis is used as the δ-axis, is defined. When the control angle θC is equal to the rotor angle θM, the γδ coordinate system, which is the imaginary rotating coordinate system, and the dq coordinate system, which is the actual rotating coordinate system, coincide with each other. That is, the γ-axis, which is the imaginary axis, coincides with the d-axis, which is the actual axis, and the δ-axis, which is the imaginary axis, coincides with the q-axis, which is the actual axis. The γδ coordinate system is an imaginary rotating coordinate system that rotates in accordance with the control angle θC. Coordinate conversion may be made between the UVW coordinate system and the γδ coordinate system with the use of the control angle θC.

The load angle θL (=θC−θM) is defined based on the difference between the control angle θC and the rotor angle θM.

When the γ-axis current Iγ is supplied to the motor 3 based on the control angle θC, the q-axis component of the γ-axis current Iγ (orthogonal projection to the q-axis) is used as the q-axis current Iq that contributes to generation of torque by the rotor 50. That is, the relationship expressed by Equation 1 is established between the γ-axis current Iγ and the q-axis current Iq.

$$Iq = I\gamma \times \sin \theta L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current IU, the V-phase current IV and the W-phase current IW that flow through the U-phase stator coil 51, the V-phase stator coil 52, and the W-phase stator coil 53 of the motor 3, respectively, (these phase currents will be collectively referred to as "three-phase detected current IUVW" where appropriate). The U-phase current IU, the V-phase current IV and the W-phase current IW are the current values in the directions of the axes of the UVW coordinate system.

The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional integral) control unit 23, an addition angle limiter 24, an addition angle monitoring unit 25, a control angle calculation unit 26, a gain change unit 27, an induced voltage estimation unit 28, a rotational angle estimation unit 29, a rotor angular displacement calculation unit 30, a command current value preparation unit 31, a current deviation calculation unit 32, a PI control unit 33, a γδ/αβ conversion unit 34A, an αβ/UVW conversion unit 34B, a PWM (Pulse Width Modulation) control unit 35, a UVW/αβ conversion unit 36A, an αβ/γδ conversion unit 36B, a torque deviation monitoring unit 40, and an addition angle guard 41.

Figure 4:
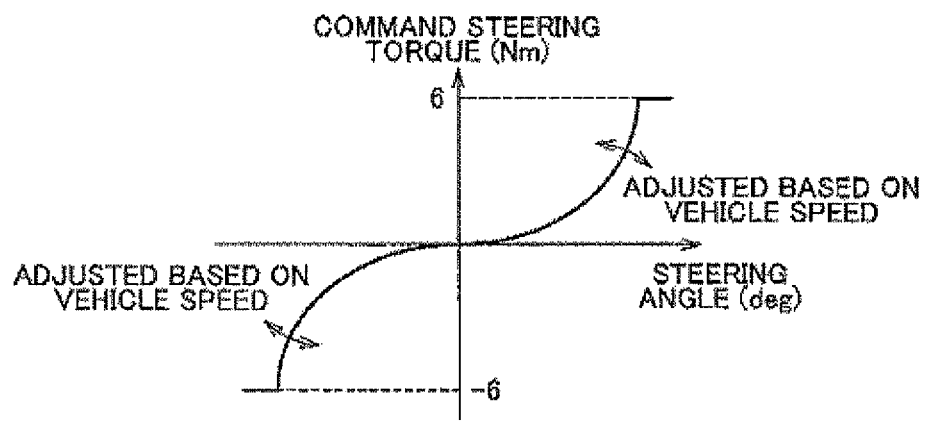
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), and the command steering torque T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6 Nm)) and a predetermined lower limit (negative value (e.g. −6 Nm)). In addition, the command steering torque T* is set in such a manner that the absolute value of the command steering torque T* decreases as the vehicle speed increases. That is, a vehicle speed-sensitive control is executed.

Figure 5:
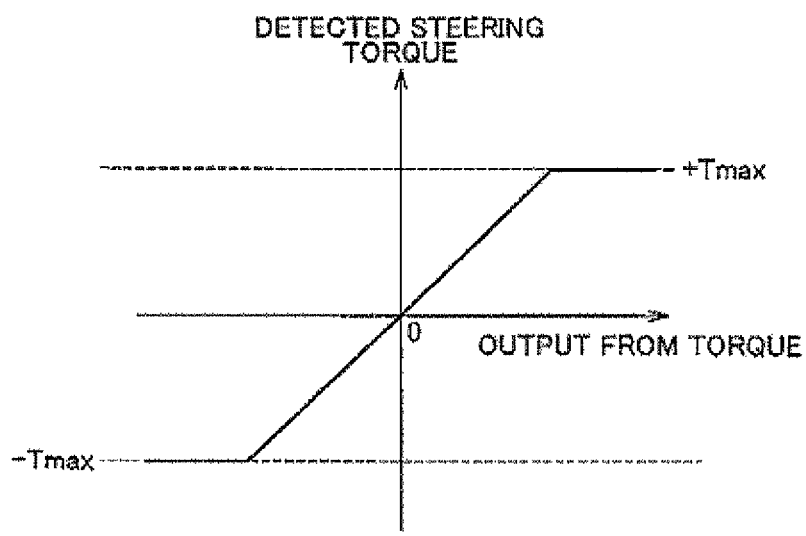
FIG. 5 is a graph for describing the function of a steering torque limiter.

The steering torque limiter 20 limits the output from the torque sensor 1 within a range between a predetermined upper saturation value +Tmax (+Tmax>0 (e.g. +Tmax=7 Nm)) and a predetermined lower saturation value −Tmax (−Tmax<0 (e.g. −Tmax=−7 Nm)). More specifically, as shown in FIG. 5, when the output from the torque sensor 1 is within the range between the upper saturation value +Tmax and the lower saturation value −Tmax, the steering torque limiter 20 outputs the detected steering torque T that is the value output from the torque sensor 1 without limitation. When the detected steering torque T from the torque sensor 1 is equal to or higher than the upper saturation value +Tmax, the steering torque limiter 20 outputs the upper saturation value +Tmax. When the detected steering torque T from the torque sensor 1 is equal to or lower than the lower saturation value −Tmax, the steering torque limiter 20 outputs the lower saturation value −Tmax. The saturation values +Tmax and −Tmax define a stable range (reliable range) of the output signal from the torque sensor 1. That is, in the range where the output from the torque sensor 1 is higher than the upper saturation value +Tmax and the range where the output from the torque sensor 1 is lower than the lower saturation value −Tmax, the output signal from the torque sensor 1 is unstable and does not correspond to the actual steering torque. In other words, the saturation values +Tmax and −Tmax are determined based on the output characteristic of the torque sensor 1.

The torque deviation calculation unit 22 obtains the deviation (torque deviation) $\Delta T$ ($=T^*-T$) of the steering torque T that is detected by the torque sensor 1 and then subjected to the limiting process executed by the torque limiter 20 (hereinafter, referred to as "detected steering torque T" so as to be distinguished from the command steering torque $T^*$) from the command steering torque $T^*$ that is set by the command steering torque setting unit 21. The PI control unit 23 executes the PI calculation on the torque deviation $\Delta T$. That is, the torque deviation calculation unit 22 and the PI control unit 23 constitute a torque feedback control unit that brings the detected steering torque T to the command steering torque $T^*$. The PI control unit 23 calculates the addition angle $\alpha$ for the control angle $\theta C$ by executing the PI calculation on the torque deviation $\Delta T$. Therefore, the torque feedback control unit constitutes an addition angle calculation unit that calculates the addition angle $\alpha$.

More specifically, the PI control unit 23 includes a proportional element 23a, an integral element 23b, and an adder 23c. Note that KP is a proportional gain, KI is an integral gain, and 1/s is an integration operator. A proportional term (proportional calculation value) for a proportional integration calculation is obtained by the proportional element 23a, and an integral term (integral calculation value) for the proportional integration calculation is obtained by the integral element 23b. The adder 23c adds up the results of calculations executed by these elements 23a and 23b (the proportional term and the integral term) to obtain the addition angle $\alpha$.

The addition angle limiter 24 is an addition angle limiting unit that imposes limits on the addition angle $\alpha$ obtained by the PI control unit 23. More specifically, the addition angle limiter 24 limits the addition angle $\alpha$ to a value within a range between a predetermined upper limit UL (positive value) and a predetermined lower limit LL (negative value). The upper limit UL and the lower limit LL are determined based on a predetermined limit $\omega$max ($\omega$max>0: e.g. $\omega$max=45 degrees). The predetermined limit $\omega$max is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 2. The number of pole pairs is the number of magnetic pole pairs (pair of north pole and south pole) of the rotor 50.

Maximum rotor angular speed=maximum steering angular speed×speed reduction ratio×number of pole pairs   Equation 2

The maximum value of the amount of change in the electrical angle of the rotor 50 between the calculations (in the calculation cycle) of the control angle $\theta C$ is expressed by the value obtained by multiplying the maximum rotor angular speed by the calculation cycle, as indicated by Equation 3.

Maximum value of amount of change in rotor angle=maximum rotor angular speed×calculation cycle=maximum steering angular speed×speed reduction ratio×number of pole pairs×calculation cycle   Equation 3

This maximum value of the amount of change in the rotor angle is the maximum amount of change in the control angle $\theta C$ that is permitted within one calculation cycle. Therefore, the maximum value of the amount of change in the rotor angle may be used as the limit (max. With the use of the limit (max, the upper limit UL and the lower limit LL for the addition angle $\alpha$ are expressed by Equation 4 and Equation 5, respectively.

UL=+$\omega$max   Equation 4

LL=−$\omega$max   Equation 5

The addition angle $\alpha$ obtained after the above-described limiting process executed by the addition angle limiter 24 is added to the immediately preceding value $\theta C(n-1)$ (n is the number of the present calculation cycle) of the control angle $\theta C$ by an addition unit 26A of the control angle calculation unit 26 ("Z−1" in the drawings indicates the immediately preceding value indicated by a signal). Note that, the initial value of the control angle $\theta C$ is a predetermined value (e.g. 0).

The control angle calculation unit 26 includes the addition unit 26A that adds the addition angle $\alpha$ provided from the addition angle limiter 24 to the immediately preceding value $\theta C(n-1)$ of the control angle $\theta C$. That is, the control angle calculation unit 26 calculates the control angle $\theta C$ at each predetermined calculation cycle. The control angle calculation unit 26 uses the control angle $\theta C$ in the immediately preceding calculation cycle as the immediately preceding value $\theta C(n-1)$, and obtains the present value $\theta C(n)$ that is the control angle $\theta C$ in the present calculation cycle based on the immediately preceding value $\theta C(n-1)$.

The addition angle monitoring unit 25 monitors the addition angle $\alpha$ that is prepared by the addition angle limiter 24. More specifically, the addition angle monitoring unit 25 monitors whether the absolute value of the addition angle $\alpha$ has reached the addition angle threshold that is smaller than the limit $\omega$max. If the addition angle absolute value $|\alpha|$ is equal to or larger than the addition angle threshold, the addition angle monitoring unit 25 provides the gain change unit 27 with the information that the addition angle absolute value $|\alpha|$ is equal to or larger than the addition angle threshold.

When the information that the addition angle absolute value $|\alpha|$ is excessively large (equal to or larger than the addition angle threshold) is provided from the addition angle monitoring unit 25 to the gain change unit 27, the gain change unit 27 changes the gains (the proportional gain and the integral gain) of the PI control unit 23 to values that are smaller than the normal values. Thus, for example, when the steering speed is high, the gains of the PI control unit 23 are decreased before the addition angle limiter 24 is actuated. Therefore, limits are less likely to be imposed by the addition angle limiter 24. As a result, it is possible to stabilize the control, thereby improving a steering feel.

The gains of the PI control unit 23 are changed in such a manner that when the addition angle absolute value |α| is equal to or larger than the addition angle threshold, the gains are decreased. Alternatively, the gains of the PI control unit 23 may be changed in such a manner that the gains are decreased as the addition angle absolute value |α| increases.

The induced voltage estimation unit 28 estimates the induced voltage that is generated by the rotation of the motor 3. The rotational angle estimation unit 29 calculates the estimated value θE of the rotational angle (estimated rotational angle) of the rotor 50 based on the induced voltage that is estimated by the induced voltage estimation unit 28. Concrete examples of the induced voltage estimation unit 28 and the rotational angle estimation unit 29 will be described later.

The rotor angular displacement calculation unit 30 obtains the amount of change in the estimated rotational angle θE in the calculation cycle to obtain the angular displacement Δθ (value corresponding to the rotational angular speed) of the rotor 50 in the calculation cycle. The rotor angular displacement calculation unit 30 constitutes an angular speed calculation unit.

The command current value preparation unit 31 prepares, as command current values, values of electric currents that should be supplied to the coordinate axes (imaginary axes) of the γδ coordinate system, which is the imaginary rotating coordinate system that corresponds to the control angle θC that is a rotational angle used in the control. More specifically, the command current value preparation unit 31 prepares the γ-axis command current value Iγ* and the δ-axis command current value Iδ* (hereinafter, these values will be collectively referred to as "two-phase command current value Iγδ*" where appropriate). The command current value preparation unit 31 sets the γ-axis command current value Iγ* to a significant value, and sets the δ-axis command current value Iδ* to 0. More specifically, the command current value preparation unit 31 sets the γ-axis command current value Iγ* based on the detected steering torque T that is detected by the torque sensor 1.

Figure 6:
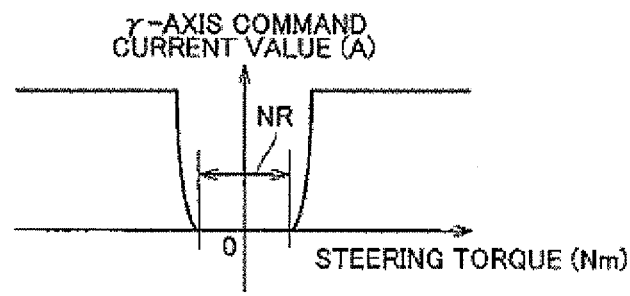
FIG. 6 is a graph showing an example of a manner of setting the γ-axis command current value.

FIG. 6 shows an example of a manner of setting the γ-axis command current value Iγ* with respect to the detected steering torque T. The dead band NR is set in a region near the point at which the detected steering torque T is 0. The γ-axis command current value Iγ* rises sharply in the region outside the dead band NR, and is maintained substantially constant in the region where the torque is at or higher than a predetermined value. Thus, when the driver does not operate the steering wheel 10, electric power supply to the motor 3 is stopped to suppress unnecessary electric power consumption.

The current deviation calculation unit 32 calculates the deviation Iγ*−Iγ of the γ-axis detected current Iγ from the γ-axis command current value Iγ* prepared by the command current value preparation unit 31 and the deviation Iδ*−Iδ of the δ-axis detected current Iδ from the δ-axis command current value Iδ*(=0) prepared by the command current value preparation unit 31. The γ-axis detected current Iγ and the δ-axis detected current Iδ are provided from the αβ/γδ conversion unit 36B to the deviation calculation unit 32.

The UVW/αβ conversion unit 36A converts the three-phase detected current IUVW (U-phase detected current IU, V-phase detected current IV, and the W-phase detected current IW) of the UVW coordinate system, which is detected by the current detection unit 13, into the two-phase detected currents Iα and Iβ of the αβ coordinate system that is the two-phase fixed coordinated system (hereinafter, these phase currents will be collectively referred to as "two-phase detected current Iαβ" where appropriate). As shown in FIG. 2, the αβ coordinate system is a fixed coordinate system that is defined by setting the α-axis and the β-axis that is perpendicular to the α-axis (in the example in FIG. 2, the β-axis coincides with the U-axis) within the rotary plane of the rotor 50 using the rotational center of the rotor 50 as the origin. The αβ/γδ conversion unit 36B converts the two-phase detected current Iαβ into the two-phase detected currents Iγ and Iδ of the γδ coordinate system (hereinafter, these phase currents will be collectively referred to as "two-phase detected current Iγδ" where appropriate). These two-phase detected currents Iγ and Iδ are provided to the current deviation calculation unit 32. The control angle θC calculated by the control angle calculation unit 26 is used for the coordinate conversion that is executed by the αβ/γδ conversion unit 36B.

The PI control unit 33 executes the PI calculation on the current deviation calculated by the current deviation calculation unit 32 to prepare the two-phase command voltage Vγδ* (the Γ-axis command voltage Vγ* and the δ-axis command voltage Vδ*) that should be applied to the motor 3. The two-phase command voltage Vγδ* is provided to the γδ/αβ conversion unit 34A.

The γδ/αβ conversion unit 34A converts the two-phase command voltage Vγδ* into the two-phase command voltage Vαβ* of the αβ coordinate system. The control angle θC calculated by the control angle calculation unit 26 is used for this coordinate conversion. The two-phase command voltage Vαβ* is formed of the α-axis command voltage Vα* and the β-axis command voltage Vβ*. The αβ/UVW conversion unit 34B executes the coordinate conversion calculation on the two-phase command voltage Vαβ* to prepare the three-phase command voltage VUVW*. The three-phase command voltage VUVW* is formed of the U-phase command voltage VU*, the V-phase command voltage VV* and the W-phase command voltage VW*. The three-phase command voltage VUVW* is provided to the PWM control unit 35.

The PWM control unit 35 prepares the U-phase PWM control signal, the V-phase PWM control signal and the W-phase PWM control signal having duty ratios that correspond to the U-phase command voltage VU*, the V-phase command voltage VV* and the W-phase command voltage VW*, respectively, and provides the control signals to the drive circuit 12.

The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage VUVW* are applied to the U-phase stator coil 51, the V-phase stator coil 52 and the W-phase stator coil 53 of the motor 3.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value Iγδ* that is set by the command current value preparation unit 31.

The command current value preparation unit 31, the current deviation calculation unit 32, the PI control unit 33, the γδ/αβ conversion unit 34A, the αβ/UVW conversion unit 34B, the PWM control unit 35, the drive circuit 12, the UVW/αβ conversion unit 36A and the αβ/γδ conversion unit 36B constitute a current drive unit.

The torque deviation monitoring unit 40 monitors the sign of the torque deviation ΔT that is calculated by the torque deviation calculation unit 22 to determine the magnitude relationship between the command steering torque T* and the detected steering torque T. The result of determination is provided to the addition angle guard 41.

The addition angle guard 41 executes an addition angle guard process on the addition angle α that is prepared by the PI control unit 23. In the addition angle guard process, if the addition angle α that is prepared by the PI control unit 23 contradicts the magnitude relationship between the command steering torque T* and the detected steering torque T, the addition angle α is corrected in such a manner that this contradiction is resolved. More specifically, the addition angle guard 41 corrects the addition angle α based on the rotor angular displacement Δθ that is obtained by the rotor angular displacement calculation unit 30, when necessary. Because the rotor angular displacement Δθ corresponds to the angular speed of the rotor, the process in the addition angle guard 41 is the process that corrects the addition angle α based on the angular speed of the rotor.

Figure 3:
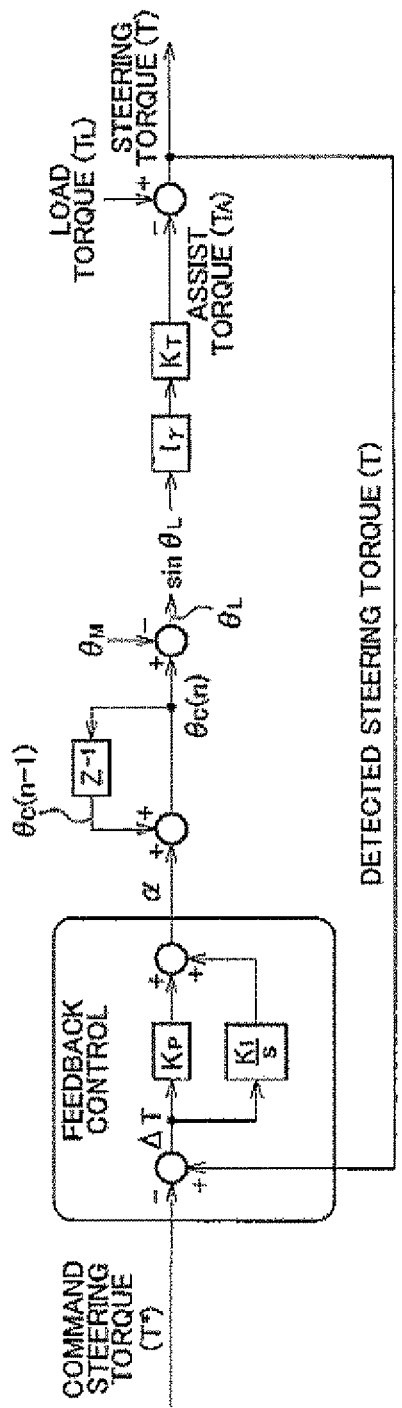
FIG. 3 is a control block diagram of the electric power steering apparatus.

FIG. 3 is a control block diagram of the electric power steering apparatus. Note that the functions of the addition angle guard 41 the addition angle limiter 24 are omitted to simplify the explanation.

Through the PI control (KP is a proportionality coefficient, KI is an integration coefficient, and 1/s is an integration operator) on the deviation (torque deviation) ΔT of the detected steering torque T from the command steering torque T*, the addition angle α is prepared. The present value θC(n) (θC(n)=θC(n−1)+α) of the control angle θC is obtained by adding the addition angle α to the immediately preceding value θC(n−1) of the control angle θC. At this time, the deviation of the actual rotor angle θM of the rotor 50 from the control angle θC is used as the load angle θL(θL=θC−θM).

Therefore, if the γ-axis current Iγ is supplied to the γ-axis (imaginary axis) in the γδ coordinate system (imaginary rotating coordinate system), which rotates in accordance with the control angle θC, based on the γ-axis command current value Iγ*, the q-axis current Iq is equal to Iγ sin θL(Iq=Iγ sin θL). The q-axis current Iq contributes to generation of torque by the rotor 50. That is, the value obtained by multiplying the q-axis current Iq (=Iγ sin θL) by the torque constant KT of the motor 3 is transmitted to the steering mechanism 2 via the speed reduction mechanism 7 as the assist torque TA (=KT×Iγ sin θL). The value obtained by subtracting the assist torque TA from the load torque TL from the steering mechanism 2 is the steering torque T that should be applied by the driver to the steering wheel 10. When the steering torque T is fed back, a system is operated in such a manner that the steering torque T is brought to the command steering torque T*. That is, the addition angle α is obtained and the control angle θC is controlled based on the addition angle α so that the detected steering torque T coincides with the command steering torque T*.

The control angle θC is updated with the use of the addition angle α that is obtained based on the deviation ΔT of the detected steering torque T from the command steering torque T* while an electric current is supplied to the γ-axis that is the imaginary axis used in the control. Thus, the load angle θL changes and therefore, the torque that corresponds to the load angle θL is generated by the motor 3. Therefore, the torque that corresponds to the command steering torque T* set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Therefore, there is provided the electric power steering apparatus in which an appropriate steering assist operation is executed by appropriately controlling the motor 3 without using a rotational angle sensor. Thus, the configuration is simplified and cost is reduced.

In the first embodiment, the addition angle α is controlled in such a manner that the load angle θL is adjusted in a correlation region where the load angle θL and the motor torque (assist torque) are positively correlated with each other. More specifically, because the q-axis current Iq is equal to Iγ sin θL(Iq=Iγ sin θL), the addition angle α is controlled in such a manner that the load angle θL is equal to or larger than −90 degrees and equal to or smaller than 90 degrees (−90°≤θL≤90°). As a matter of course, the addition angle α may be controlled in such a manner that the load angle θL is adjusted in a correlation region where the load angle θL and the motor torque (assist torque) are negatively correlated with each other. In this case, the addition angle α is controlled in such a manner that the load angle θL is equal to or larger than 90 degrees and equal to or smaller than 270 degrees (90°≤θL≤270°). If the gain of the PI control unit 23 is set to a positive value, the control is executed within the correlation region where the load angle θL and the motor torque (assist torque) are positively correlated with each other. On the other hand, if the gain of the PI control unit 23 is set to a negative value, the control is executed within the correlation region where the load angle θL and the motor torque (assist torque) are negatively correlated with each other.

Figure 7:
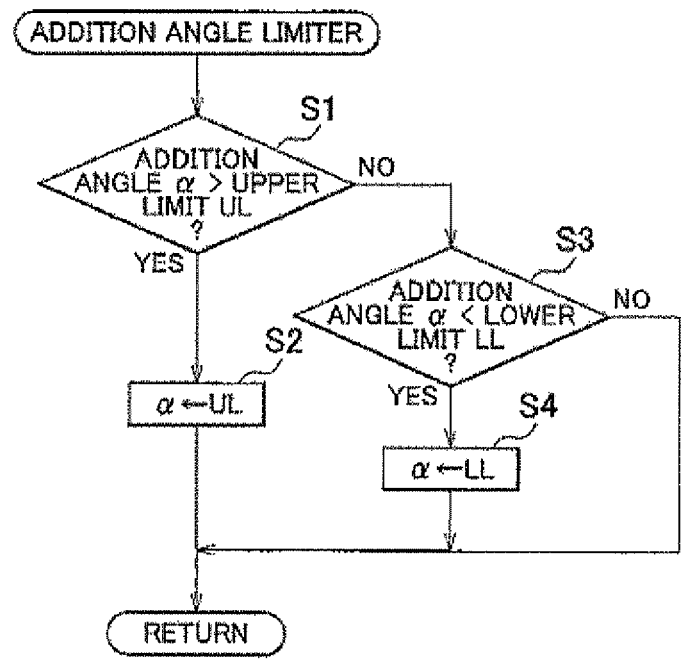
FIG. 7 is a flowchart for describing the function of an addition angle limiter.

FIG. 7 is a flowchart for describing the function of the addition angle limiter 24. The addition angle limiter 24 compares the addition angle α obtained by the PI control unit 23 with the upper limit UL of the addition angle (step (hereinafter, referred to as "S")1). When the addition angle α is larger than the upper limit UL ("YES" in S1), the upper limit UL is substituted for the addition angle α (S2). Thus, the upper limit UL (=+ωmax) is added to the control angle θC.

When the addition angle α obtained by the PI control unit 23 is equal to or smaller than the upper limit UL ("NO" in S1), the addition angle limiter 24 further compares the addition angle α with the lower limit LL of the addition angle (S3). When the addition angle α is smaller than the lower limit LL ("YES" in S3), the lower limit LL is substituted for the addition angle α (S4). Thus, the lower limit LL (=−ωmax) is added to the control angle θC.

When the addition angle α is equal to or larger than the lower limit LL and equal to or smaller than the upper limit UL ("NO" in S3), the addition angle α is added to the control angle θC without correction. Therefore, the addition angle limiter 24 limits the addition angle α within the range between the upper limit UL of the addition angle and the lower limit LL of the addition angle so as to stabilize the control. More specifically, although the control state is unstable (assist force is unstable) when the electric current is small or when the control starts, the addition angle limiter 24 encourage the control to move to the stable state.

Figure 8A:
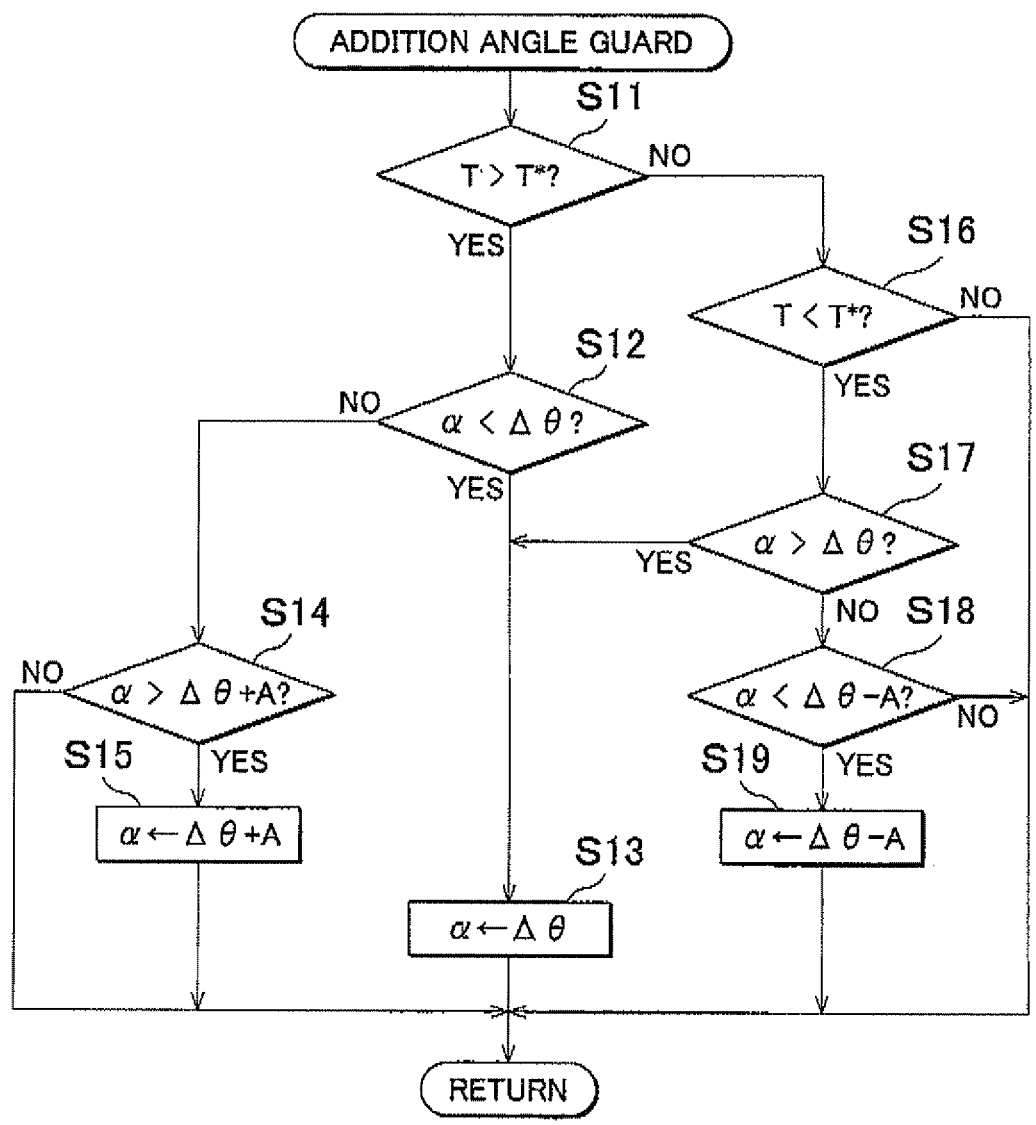
FIG. 8A is a flowchart for describing the function of an addition angle guard when the load angle and the motor torque are positively correlated with each other.

FIG. 8A is a flowchart for describing an addition angle guard process. Note that FIG. 8A shows an example of the process that is executed when the addition angle α is controlled in such a manner that the load angle θL is adjusted in the correlation region where the load angle θL and the motor torque (assist torque) are positively correlated with each other.

The torque deviation monitoring unit 40 monitors the sign of the torque deviation ΔT that is calculated by the torque deviation calculation unit 22, and provides the addition angle guard 41 with the information concerning the magnitude relationship between the command steering torque T* and the detected steering torque T. The addition angle guard 41 constitutes an addition angle correction unit.

When the detected steering torque T is higher than the command steering torque T* ("YES" in S11), the addition angle guard 41 determines whether the addition angle α that is obtained by the PI control unit 23 is smaller than the rotor angular displacement Δθ in the calculation cycle that is obtained by the rotor angular displacement calculation unit 30 (S12). When an affirmative determination is made in S12, the addition angle guard 41 substitutes the rotor angular displacement Δθ for the addition angle α (S13). That is, the addition angle α is corrected to the rotor angular displacement Δθ. If the addition angle α is equal to or larger than the rotor angular displacement Δθ ("NO" in S12), the addition angle guard 41 further compares the addition angle α with the value (Δθ+A) that is larger than the rotor angular displacement Δθ by the predetermined change limit A (A>0: e.g. A=7 degrees) (S14). When the addition angle α is larger than the value (Δθ+A) ("YES" in S14), the addition angle guard 41 substitutes the value (Δθ+A) for the addition angle α (S15). That is, the addition angle α is corrected to the value (Δθ+A) that is larger than the rotor angular displacement Δθ by the predetermined change limit A. When the addition angle α is equal to or smaller than the value (Δθ+A) ("NO" in S14), the addition angle α is not corrected.

On the other hand, when the detected steering torque T is lower than the command steering torque T* ("NO" in S11 and "YES" in S16), the addition angle guard 41 determines whether the addition angle α obtained by the PI control unit 23 is larger than the rotor angular displacement Δθ (S17). When an affirmative determination is made in S17, the addition angle guard 41 substitutes the rotor angular displacement Δθ for the addition angle α (S13) to correct the addition angle α to the rotor angular displacement Δθ. When the addition angle α is equal to or smaller than the rotor angular displacement Δθ ("NO" in S17), the addition angle guard 41 further compares the addition angle α with the value (Δθ−A) that is smaller than the rotor angular displacement Δθ by the change limit A (S18). When the addition angle α is smaller than the value (Δθ−A) ("YES" in S18), the addition angle guard 41 substitutes the value (Δθ−A) for the addition angle α (S19). That is, the addition angle α is corrected to the value (Δθ−A) that is smaller than the rotor angular displacement Δθ by the predetermined change limit A. When the addition angle α is equal to or larger than the value (Δθ−A) ("NO" in S18), the addition angle α is not corrected.

When the detected steering torque T is equal to the command steering torque T* ("NO" in both S11 and S16), the addition angle α is not corrected.

The addition angle α is the amount of change in the control angle θC in the calculation cycle, and is equal to the angular displacement (corresponding to the rotational angular speed) of the γδ coordinate axis in the calculation cycle. Therefore, when the addition angle α is larger than the rotor angular displacement Δθ in the calculation cycle, the load angle θL is increased. On the other hand, when the addition angle α is smaller than the rotor angular displacement Δθ in the calculation cycle, the load angle θL is decreased. When the load angle θL and the motor torque (assist torque) are positively correlated with each other, the motor torque is increased if the load angle θL increases, and the motor torque is decreased if the load angle θL decreases.

When the detected steering torque T is higher than the command steering torque T*, the motor torque (assist torque) is insufficient. Therefore, the load angle θL is increased in order to increase the motor torque. That is, when the addition angle α is equal to or larger than the rotor angular displacement Δθ, the load angle θL is increased. Because the motor torque increases, the detected steering torque T approaches the command steering torque T*. In the first embodiment, in S11 to S13 in FIG. 8A, the addition angle guard process is executed. In this addition angle guard process, the addition angle α is corrected to a value equal to or larger than the rotor angular displacement Δθ when the detected steering torque T is higher than the command steering torque T*. In other words, if the addition angle α is smaller than the rotor angular displacement Δθ although the detected steering torque T is higher than the command steering torque T*, the object of the control is not achieved and there is a contradiction. Such a situation may occur depending on, for example, the response of the PI control unit 23. Therefore, in this case, the addition angle α is corrected to a value equal to or larger than the rotor angular displacement Δθ (in the first embodiment, the addition angle α is corrected to the value equal to the rotor angular displacement Δθ). As a matter of course, the addition angle α may be corrected to a value larger than the rotor angular displacement Δθ (for example, a value that is larger than the rotor angular displacement Δθ by a predetermined value (a value smaller than the change limit A)).

The following process is executed based on the same concept. When the detected steering torque T is lower than the command steering torque T*, the motor torque (assist torque) is excessive. Therefore, the load angle θL is decreased to decrease the motor torque. That is, when the addition angle α is equal to or smaller than the rotor angular displacement Δθ, the load angle θL is decreased. Because the motor torque decreases, the detected steering torque T approaches the command steering torque T*. Therefore, in the first embodiment, in S16, S17 and S13 in FIG. 8A, the addition angle guard process is executed. In this addition angle guard process, the addition angle α is corrected to a value equal to or smaller than the rotor angular displacement Δθ when the detected steering torque T is lower than the command steering torque T*. In other words, if the addition angle α is larger than the rotor angular displacement Δθ although the detected steering torque T is lower than the command steering torque T*, the object of the control is not achieved and there is a contradiction. Such a situation may occur depending on, for example, the response of the PI control unit 23. Therefore, in this case, the addition angle α is corrected to a value equal to or smaller than the rotor angular displacement Δθ (in the first embodiment, the addition angle α is corrected to the value equal to the rotor angular displacement Δθ). As a matter of course, the addition angle α may be corrected to a value smaller than the rotor angular displacement Δθ (for example, a value that is smaller than the rotor angular displacement Δθ by a predetermined value (a value smaller than the change limit A)).

In the first embodiment, when the detected steering torque T is higher than the command steering torque T* ("YES" in S11) and the addition angle α is equal to or larger than the rotor angular displacement Δθ ("NO" in S12), the addition angle α is compared with the value that is obtained by adding the change limit A to the rotor angular displacement Δθ (S14). When the addition angle α is larger than the value that is obtained by adding the change limit A to the rotor angular displacement Δθ ("YES" in S14), the addition angle α is corrected to the value (Δθ+A) (S15). This is because, if the addition angle α is excessively larger than the rotor angular displacement Δθ in the calculation cycle, it takes a long time to bring the addition angle α to an appropriate value.

When the detected steering torque T is lower than the command steering torque T* ("YES" in S16) and the addition angle α is equal to or smaller than the rotor angular displacement Δθ ("NO" in S17), the addition angle α is compared with the value that is obtained by subtracting the change limit A from the rotor angular displacement Δθ(S18). When the addition angle α is smaller than the value that is obtained by subtracting the change limit A from the rotor angular displacement Δθ ("YES" in S18), the addition angle α is corrected to the value (Δθ−A) (S19). This is because, if the addition angle α is excessively smaller than the rotor angular displacement Δθ in the calculation cycle, it takes a long time to bring the addition angle α to an appropriate value. If the above-described correction is made, the addition angle α is more easily brought to the appropriate value. Therefore, it is possible to stabilize the control. Even if an abnormality occurs in the control, it is possible to effectively encourage the control to move to the normal state.

As described above, in the guard process in FIG. 8A, when the detected steering torque T is higher than the command steering torque T*, the addition angle α is corrected in such a manner that the addition angle α is equal to or smaller than (Δθ+A) and equal to or larger than Δθ (Δθ+A≥α≥Δθ). On the other hand, when the detected steering torque T is lower than the command steering torque T*, the addition angle α is corrected in such a manner that the addition angle α is equal to or smaller than Δθ and equal to or larger than (Δθ−A) (Δθ≥α≥Δθ−A). Thus, the addition angle α is brought to an appropriate value corresponding to the rotor angular displacement Δθ.

Figure 8B:
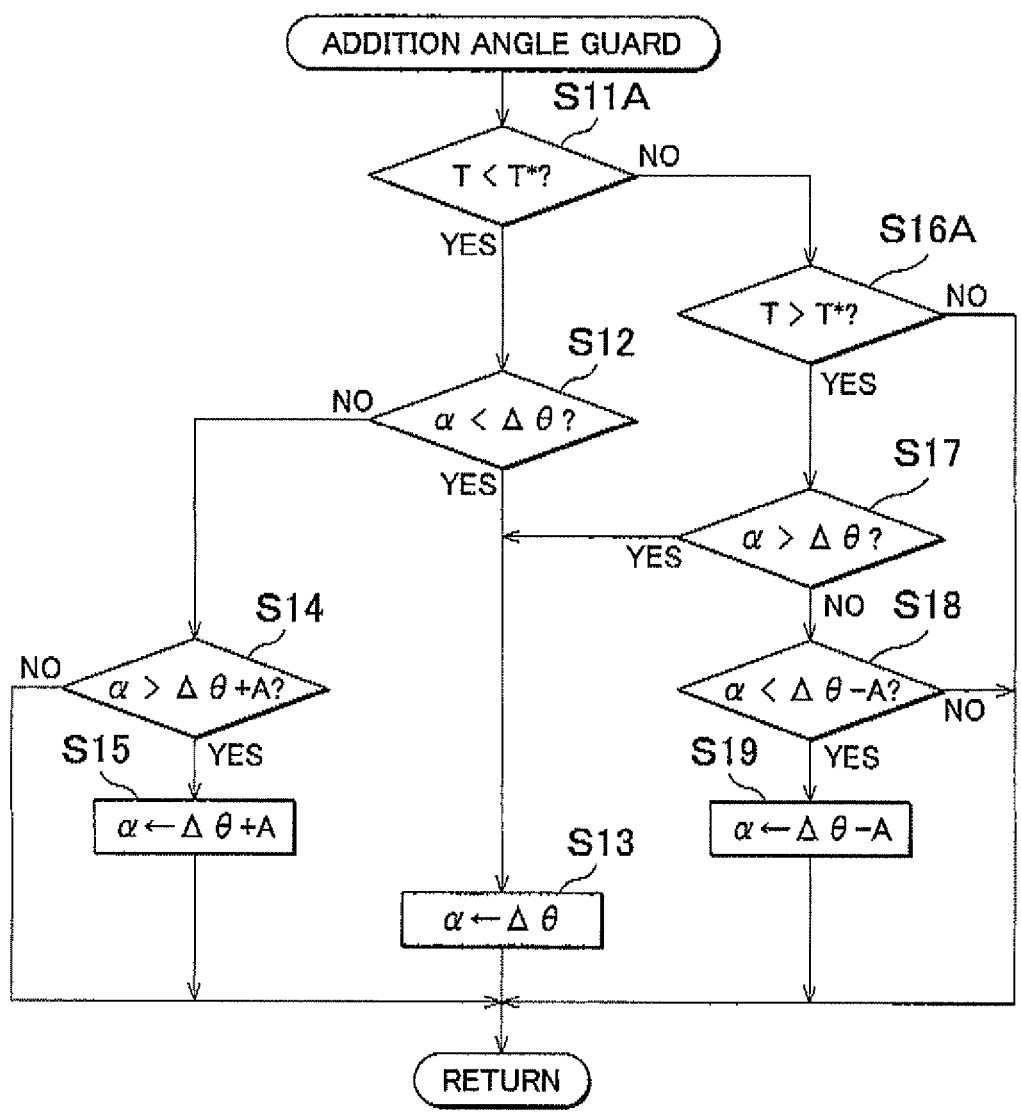
FIG. 8B is a flowchart for describing the function of the addition angle guard when the load angle and the motor torque are negatively correlated with each other.

FIG. 8B shows an example of the addition angle guard process when the addition angle α is controlled in such a manner that the load angle θL is adjusted within the correlation region where the load angle θL and the motor torque (assist torque) are negatively correlated with each other. The steps in FIG. 8B, in which the same processes as those in the steps in FIG. 8A are executed, are denoted by the same reference numerals used in FIG. 8A. In the process shown in FIG. 8B, the processes based on the magnitude relationship between the detected steering torque T and the command steering torque T* are executed in a manner opposite to that in FIG. 8A.

When the detected steering torque T is lower than the command steering torque T* ("YES" in S11A), the addition angle guard 41 determines whether the addition angle α is smaller than the rotor angular displacement Δθ (S12). If an affirmative determination is made in S12, the addition angle guard 41 substitutes the rotor angular displacement Δθ for the addition angle α (S13). That is, the addition angle α is corrected to the rotor angular displacement Δθ. When the addition angle α is equal to or larger than the rotor angular displacement Δθ ("NO" in S12), the addition angle guard 41 further compares the addition angle α with the value (Δθ+A) that is larger than the rotor angular displacement Δθ by the change limit A (S14). When the addition angle α is larger than the value (Δθ+A) ("YES" in S14), the addition angle guard 41 substitutes the value (Δθ+A) for the addition angle α (S15). That is, the addition angle α is corrected to the value (Δθ+A). When the addition angle α is equal to or smaller than the value (Δθ+A) ("NO" in S14), the addition angle α is not corrected.

On the other hand, when the detected steering torque T is higher than the command steering torque T* ("NO" in S11A and "YES" in S16A), the addition angle guard 41 determines whether the addition angle α is larger than the rotor angular displacement Δθ (S17). If an affirmative determination is made in S17, the addition angle guard 41 substitutes the rotor angular displacement Δθ for the addition angle α (S13) to correct the addition angle α to the rotor angular displacement Δθ. When the addition angle α is equal to or smaller than the rotor angular displacement Δθ ("NO" in S17), the addition angle guard 41 further compares the addition angle α with the value (Δθ−A) that is smaller than the rotor angular displacement Δθ by the change limit A (S18). When the addition angle α is smaller than the value (Δθ−A) ("YES" in S18), the addition angle guard 41 substitutes the value (Δθ−A) for the addition angle α (S19). That is, the addition angle α is corrected to the value (Δθ−A). When the addition angle α is equal to or larger than the value (Δθ−A) ("NO" in S18), the addition angle α is not corrected.

When the detected steering torque T is equal to the command steering torque T* ("NO" in both S11A and S16A), the addition angle α is not corrected.

When the load angle θL and the motor torque (assist torque) are negatively correlated with each other, the motor torque is decreased if the load angle θL increases, and the motor torque is increased if the load angle θL decreases.

When the detected steering torque T is lower than the command steering torque T*, the motor torque (assist torque) is excessive. Therefore, the load angle θL is increased to decrease the motor torque. That is, when the addition angle α is equal to or larger than the rotor angular displacement Δθ, the load angle θL is increased. Because the motor torque decreases, the detected steering torque T approaches the command steering torque T*. In the first embodiment, in S11A to S13 in FIG. 8B, the addition angle guard process is executed. In this addition angle guard process, the addition angle α is corrected to a value equal to or larger than the rotor angular displacement Δθ when the detected steering torque T is lower than the command steering torque T*. In other words, if the addition angle α is smaller than the rotor angular displacement Δθ although the detected steering torque T is lower than the command steering torque T*, the object of the control is not achieved and there is a contradiction. Therefore, in this case, the addition angle α is corrected to a value equal to or larger than the rotor angular displacement Δθ (in the first embodiment, the addition angle α is corrected to the value equal to the rotor angular displacement Δθ). As a matter of course, the addition angle α may be corrected to a value that is larger than the rotor angular displacement Δθ (for example, a value that is larger than the rotor angular displacement Δθ by a predetermined value (a value that is smaller than the change limit A)).

The following process is executed based on the same concept. When the detected steering torque T is higher than the command steering torque T*, the motor torque (assist torque) is insufficient. Therefore, the load angle θL is decreased to increase the motor torque. That is, when the addition angle α is equal to or smaller than the rotor angular displacement Δθ, the load angle θL is decreased. Because the motor torque increases, the detected steering torque T approaches the command steering torque T*. In the first embodiment, in S16A, S17 and S13 in FIG. 8B, the addition angle guard process is executed. In this addition angle guard process, the addition angle α is corrected to a value equal to or smaller than the rotor angular displacement Δθ when the detected steering torque T is higher than the command steering torque T*. In other words, if the addition angle α is larger than the rotor angular displacement Δθ although the detected steering torque T is higher than the command steering torque T*, the object of the control is not achieved and there is a contradiction. Therefore, in this case, the addition angle α is corrected to a value equal to or smaller than the rotor angular displacement Δθ (in the first embodiment, the addition angle α is corrected to the value equal to the rotor angular displacement Δθ). As a matter of course, the addition angle α may be corrected to a value smaller than the rotor angular displacement Δθ (for example, a value that is smaller than the rotor angular displacement Δθ by a predetermined value (a value smaller than the change limit A)).

In the process in FIG. 8B, when the detected steering torque T is lower than the command steering torque T* ("YES" in S11A) and the addition angle α is equal to or larger than the rotor angular displacement Δθ ("NO" in S12), the addition angle α is compared with the value that is obtained by adding the change limit A to the rotor angular displacement Δθ (S14). When the addition angle α is larger than the value that is obtained by adding the change limit A to the rotor angular displacement Δθ ("YES" in S14), the addition angle α is corrected to the value (Δθ+A) (S15). This is because, if the addition angle α is excessively larger than the rotor angular displacement Δθ in the calculation cycle, it takes a long time to bring the addition angle α to an appropriate value.

When the detected steering torque T is higher than the command steering torque T* ("YES" in S16A) and the addition angle α is equal to or smaller than the rotor angular displacement Δθ ("NO" in S17), the addition angle α is compared with the value that is obtained by subtracting the change limit A from the rotor angular displacement Δθ (S18). When the addition angle α is smaller than the value that is obtained by subtracting the change limit A from the rotor angular displacement Δθ ("YES" in S18), the addition angle α is corrected to the value (Δθ−A) (S19). This is because, if the addition angle α is excessively smaller than the rotor angular displacement Δθ in the calculation cycle, it takes a long time to bring the addition angle α to an appropriate value. If the above-described correction is made, the addition angle α is more easily brought to the appropriate value. Therefore, it is possible to stabilize the control. Even if an abnormality occurs in the control, it is possible to effectively encourage the control to move to the normal state.

If the above-described process is executed, when the detected steering torque T is lower than the command steering torque T*, the addition angle α is corrected in such a manner that the addition angle α is equal to or smaller than (Δθ+A) and equal to or larger than Δθ (Δθ+A≥α≥Δθ). On the other hand, when the detected steering torque T is higher than the command steering torque T*, the addition angle α is corrected in such a manner that the addition angle α is equal to or smaller than Δθ and equal to or larger than (Δθ−A) (Δθ≥α≥Δθ−A). Thus, the addition angle α is brought to an appropriate value corresponding to the rotor angular displacement Δθ.

Figure 9:
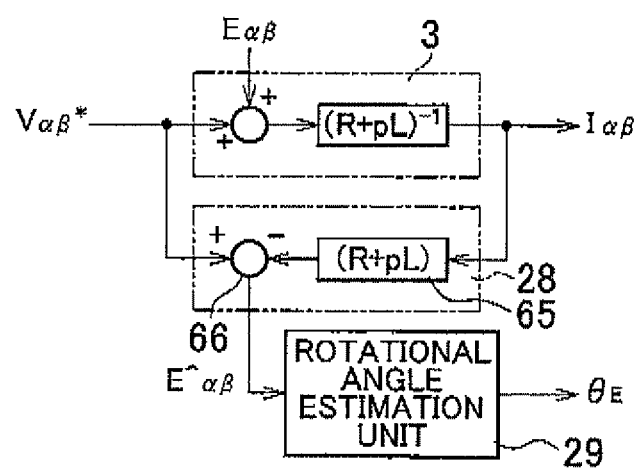
FIG. 9 is a block diagram illustrating the configurations of an induced voltage estimation unit and a rotational angle estimation unit.

FIG. 9 is a block diagram for describing the configurations of the induced voltage estimation unit 28 and the rotational angle estimation unit 29. The induced voltage estimation unit 28 estimates the inducted voltage of the motor 3 based on the two-phase detected current Iαβ and the two-phase command voltage Vαβ*. More specifically, the induced voltage estimation unit 28 is formed as a disturbance observer that estimates the induced voltage of the motor 3 as a disturbance based on a motor model that is a mathematical model of the motor 3. The motor model may be expressed by, for example, (R+pL)−1. Note that R is an armature coil resistance, L is an αβ-axis inductance, and p is a differential operator. It is considered that the two-phase command voltage Vαβ* and the induced voltage Eαβ (α-axis induced voltage Eα and the β-axis induced voltage Eβ) are applied to the motor 3.

The induced voltage estimation unit 28 is formed of an inverse motor model (inverse model of the motor model) 65 that estimates the motor voltage using the two-phase detected current Iαβ as an input, and a voltage deviation calculation unit 66 that obtains the deviation of the motor voltage that is estimated by the inverse motor model 65 from the two-phase command voltage Vαβ*. The voltage deviation calculation unit 66 obtains the disturbance to the two-phase command voltage Vαβ*. As is clear from FIG. 9, the disturbance is the estimated value Ê αβ (α-axis induced voltage estimated value Ê α and the β-axis induced voltage estimated value Ê β (hereinafter, collectively referred to as "estimated induced voltage Ê αβ")) corresponding to the induced voltage Eαβ. The inverse motor model 65 is expressed by, for example, R+pL.

The induced voltage Eαβ is expressed by Equation 6. Note that KE is the induced voltage constant, θM is the rotor angle, and ω is the rotor rotational angular speed.

$$E_{\alpha\beta} = \begin{bmatrix} E_\alpha \\ E_\beta \end{bmatrix} = \begin{bmatrix} -K_E \omega \sin\theta_M \\ K_E \omega \cos\theta_M \end{bmatrix} \quad (6)$$

Therefore, when the estimated induced voltage Ê αβ is obtained, the estimated rotational angle θE is obtained according to Equation 7. The rotational angle estimation unit 29 executes the calculation according to Equation 7.

$$\theta_E = \tan^{-1} \frac{-\hat{E}_\alpha}{\hat{E}_\beta} \quad (7)$$

Figure 10:
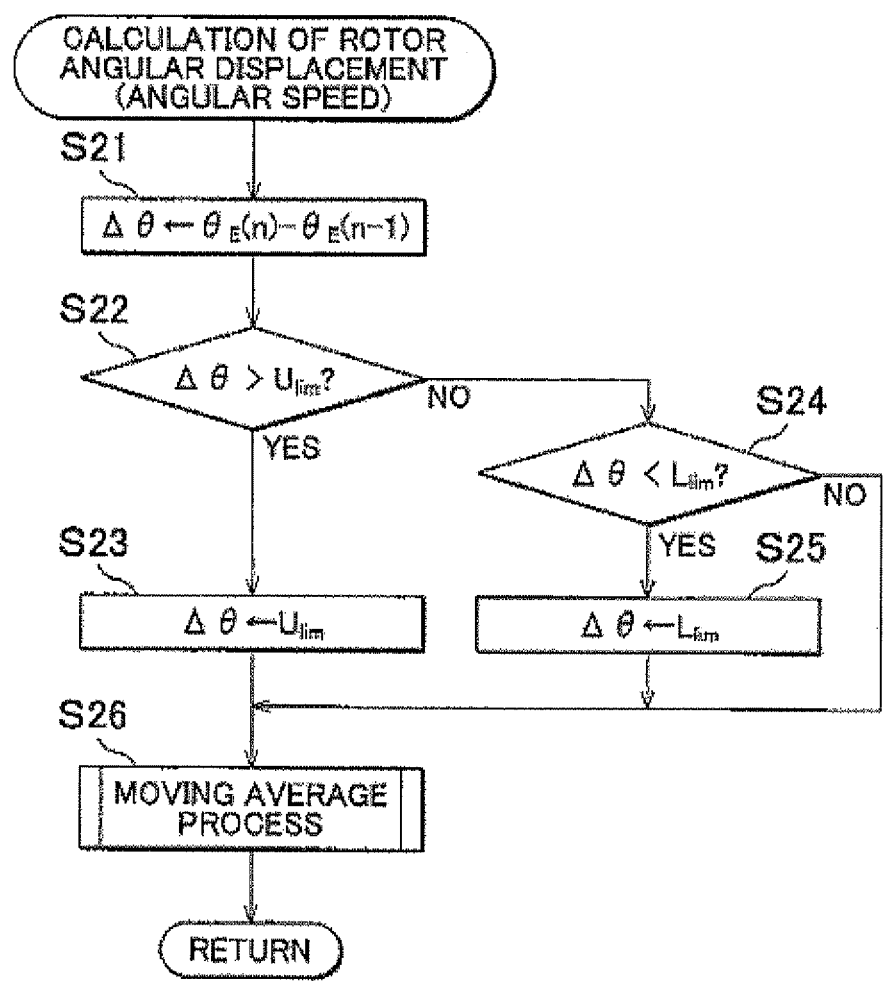
FIG. 10 is a flowchart for describing an example of a process performed in a rotor angular displacement calculation unit.

FIG. 10 is a flowchart for describing an example of the process performed in the rotor angular displacement calculation unit 30. The rotor angular displacement calculation unit 30 calculates the rotor angular displacement Δθ (S21). The rotor angular displacement Δθ is calculated by subtracting the immediately preceding value θE(n−1) of the estimated rotational angle θE obtained in the immediately preceding calculation cycle in the rotational angle estimation unit 29 from the present value θE(n) thereof. The rotor angular displacement Δθ corresponds to the value of the rotor angular speed.

Next, the rotor angular displacement calculation unit 30 compares the rotor angular displacement Δθ with a predetermined upper limit Ulim (Ulim>0) of the angular displacement (S22). When the rotor angular displacement Δθ is larger than the upper limit Ulim (YES in S22), the upper limit Ulim is substituted for the rotor angular displacement Δθ (S23). Thus, the upper limit Ulim of the angular displacement is used as the rotor angular displacement Δθ in the present calculation cycle.

On the other hand, when the rotor angular displacement Δθ calculated in S21 is equal to or smaller than the upper limit Ulim (NO in S22), the rotor angular displacement calculation unit 30 further compares the rotor angular displacement Δθ with a predetermined lower limit Llim (Llim<0, for example, Llim=−Ulim) of the angular displacement (S24). When the rotor angular displacement Δθ is smaller than the lower limit Llim (YES in S24), the lower limit Llim is substituted for the rotor angular displacement Δθ (S25). Thus, the lower limit Llim of the angular displacement is used as the rotor angular displacement Δθ in the present calculation cycle.

In the case that the rotor angular displacement Δθ is equal to or larger than the lower limit Llim and is equal to or smaller than the upper limit Ulim (NO in S22 and NO in S24), the rotor angular displacement Δθ is used as it stands.

Next, the rotor angular displacement calculation unit 30 applies a moving average process to the rotor angular displacement Δθ (S26). The value calculated by the moving average process is input to the addition angle guard 41 as the conclusive rotor angular displacement Δθ (corresponding value of the rotor angular speed). The process in S22 to S26 of the rotor angular displacement calculation unit 30 constitutes a filtering unit that is a limitation/smoothing unit and filters the rotor angular displacement (rotor angular speed) calculated by the rotor angular displacement calculation unit 30.

As described above, the rotor angular displacement calculation unit 30 calculates the rotor angular displacement Δθ (corresponding value of the rotor angular speed) based on the estimated rotational angle θE calculated in the rotational angle estimation unit 29. Further, the rotor angular displacement calculation unit 30 limits the rotor angular displacement Δθ between the upper limit Ulim of the angular displacement and the lower limit Llim thereof. Therefore, even if any of the command current value Iγδ*, the detected current Iγδ and the control angle θC changes suddenly, the addition angle α is appropriately corrected based on the rotor angular displacement Δθ.

When the driver rapidly operates the steering wheel 10, an external force is input form a road surface and etc., sudden change may happen in the command current value Iγδ*, the detected current Iγδ and/or the control angle θC. In such a case, the accuracy of the rotational angle estimated by the induced voltage estimation unit 28 and the rotational angle estimation unit 29 becomes worse. Thus, the accuracy of the rotor angular displacement Δθ calculated by using the estimated rotational angle θE also becomes worse. If such rotor angular displacement Δθ is used for correcting the addition angle α as it stands, the addition angle α is not appropriately corrected. Therefore, the steering feeling may become worse.

In the first embodiment, the rotor angular displacement Δθ is limited between the upper limit Ulim and the lower limit Llim. Further, the limited rotor angular displacement Δθ is smoothed with the moving average process. In such a manner, the influence by the sudden change of the command current value Iγδ*, the detected current Iγδ and/or the control angle θC is inhibited. Therefore, the addition angle guard 41 appropriately performs. Thus the good steering feeling is obtained.

The upper limit Ulim and the lower limit Llim of the angular displacement, for example, are determined based on the maximum steering angular speed. As described hereinbefore, the maximum steering speed is the maximum assumable value of the steering angular speed of the steering wheel 10, and, for example, approximately 800 degrees per second. Based on the similar consideration of the limit ωmax that limits the addition angle α as described hereinbefore, the maximum value of the rotor angular displacement Δθ is obtained by Equation 8.

Maximum value of rotor angular displacement=maximum rotor angular speed× calculation cycle=maximum steering angular speed×speed reduction ratio×number of pole pairs×calculation cycle     Equation 8

Therefore, the upper limit Ulim is defined by the maximum value of the rotor angular displacement, and the lower limit Llim is defined by thereof with a negative sign.

Figure 11:
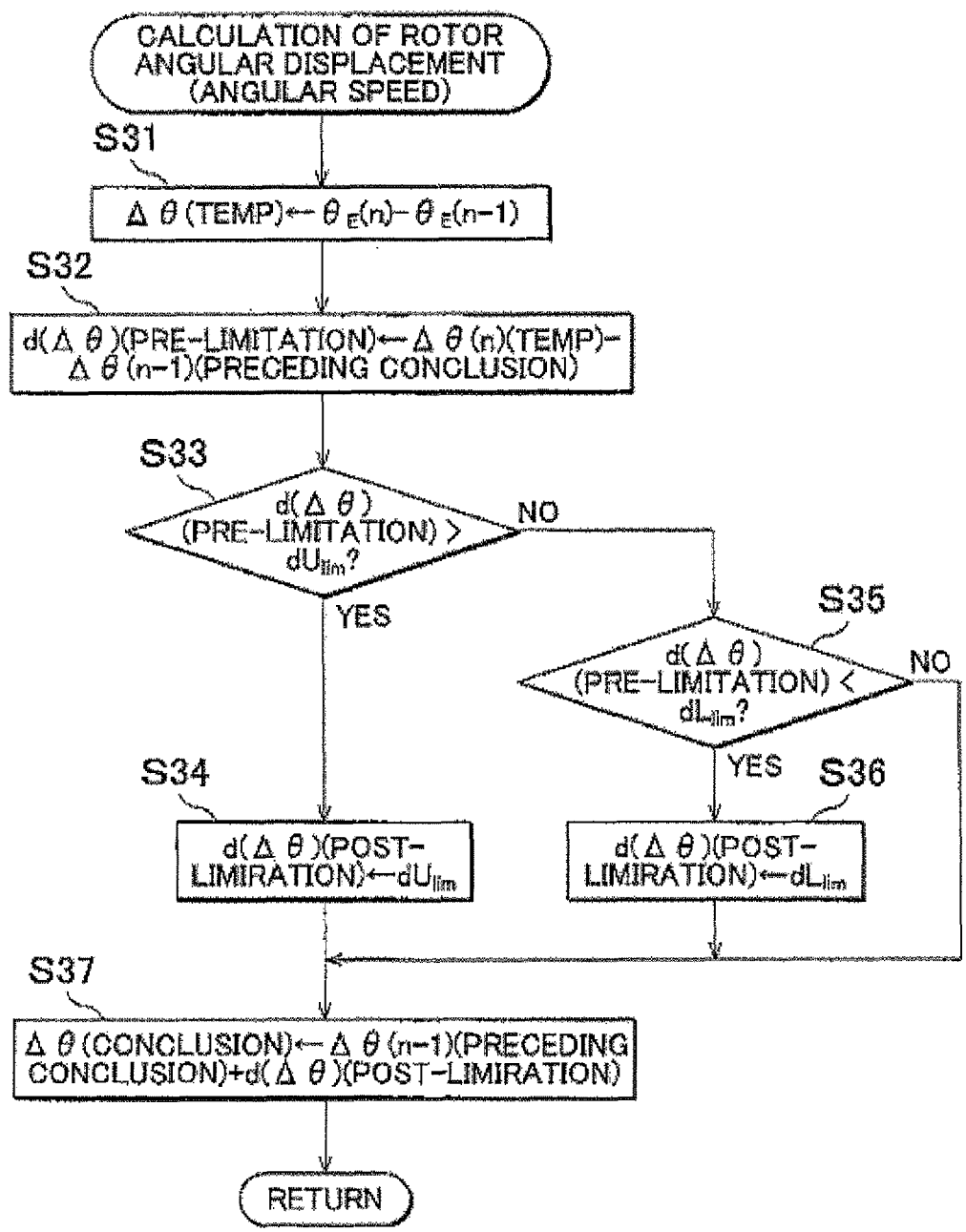
FIG. 11 is a flowchart for describing a process performed in the rotor displacement calculation unit according to a second embodiment of the invention.

FIG. 11 is a flowchart for describing a process in the rotor angular displacement calculation unit 30 according to a second embodiment. The second embodiment differs from the first embodiment only in the calculation process of the rotor angular displacement Δθ.

The rotor angular displacement calculation unit 30 calculates a temporary value Δθ(temp) of the rotor angular displacement Δθ (S31). The temporary value Δθ(temp) is calculated by subtracting the immediately preceding value θE(n−1) of the estimated rotational angle θE obtained in the immediately preceding calculation cycle in the rotational angle estimation unit 29 from the present value θE(n) thereof. The rotor angular displacement Δθ corresponds to the value of the rotor angular speed.

Further, the rotor angular displacement calculation unit 30 calculates a pre-limited value d(Δθ)(pre-limitation) of a rotor angular displacement deviation d(Δθ) (S32). The pre-limited value d(Δθ)(pre-limitation) is calculated by subtracting the conclusive immediately preceding value Δθ(n−1)(preceding conclusion) of the rotor angular displacement Δθ(n−1) prepared by the rotor angular displacement calculation unit 30 in the immediately preceding calculation cycle from the present temporary value Δθ(n)(temp) thereof. The rotor angular displacement deviation d(Δθ) corresponds to a value of a rotor angular acceleration. The process of S32 in the rotor angular displacement calculation unit (angular speed calculation unit) 30 constitutes an angular acceleration calculation unit.

Next, the rotor angular displacement calculation unit 30 compares the pre-limited value d(Δθ)(pre-limitation) of the rotor angular displacement deviation d(Δθ) with a predetermined upper limit dUlim (dUlim>0) of the rotor angular displacement deviation (S33). When the rotor angular displacement deviation d(Δθ) is larger than the upper limit dUlim (YES in S33), the upper limit dUlim is substituted for a post-limited value d(Δθ)(post-limitation) of the rotor angular displacement deviation d(Δθ) (S34). Thus, the upper limit dUlim of the rotor angular displacement deviation is used as the post-limited value d(Δθ)(post-limitation) of the rotor angular displacement deviation d(Δθ) in the present calculation cycle.

When the pre-limited value d(Δθ)(pre-limitation) of the rotor angular displacement deviation d(Δθ) is equal to or smaller than the upper limit dUlim (NO in S33), the rotor angular displacement calculation unit 30 further compares the pre-limited value d(Δθ)(pre-limitation) of the rotor angular displacement deviation d(Δθ) with a predetermined lower limit dLlim (dLlim<0, for example, dLlim=−dUlim) of the rotor angular displacement deviation (S35). When the pre-limited value d(Δθ)(pre-limitation) of the rotor angular displacement deviation d(Δθ) is smaller than the lower limit dLlim (YES in S35), the lower limit dLlim is substituted for a post-limited value d(Δθ)(post-limitation) of the rotor angular displacement deviation d(Δθ) (S36). Thus, the lower limit dLlim of the rotor angular displacement deviation is used as the post-limited value d(Δθ)(post-limitation) of the rotor angular displacement deviation d(Δθ) in the present calculation cycle.

When the rotor angular displacement deviation d(Δθ) is equal to or larger than the lower limit dLlim and equal to or smaller than the upper limit dLlim (NO in S33 and NO in S35), the pre-limited value d(Δθ)(pre-limitation) of the rotor angular displacement deviation d(Δθ) is used as the post-limited value d(Δθ)(post-limitation) as it stands. Thus, the rotor angular displacement calculation unit 30 determines the post-limited value d(Δθ)(post-limitation) that limits the rotor angular displacement deviation d(Δθ) to the value between the lower limit dLlim and the upper limit dLlim.

The rotor angular displacement calculation unit 30 adds the post-limited value d(Δθ)(post-limitation) of the rotor angular displacement deviation d(Δθ) to the conclusive immediately preceding value Δθ(n−1)(preceding conclusion) of the rotor angular displacement Δθ(n−1) prepared by the rotor angular displacement calculation unit 30 in the immediately preceding calculation cycle, so as to determine the conclusive value Δθ(n)(conclusion) of the rotor angular displacement Δθ (n) in the present calculation cycle (S37). The conclusive value Δθ(n)(conclusion) of the rotor angular displacement is used as the rotor angular displacement $\Delta\theta$ to correct the addition angle $\alpha$ in the addition angle guard 41.

According to the second embodiment, the rotor angular displacement deviation $d(\Delta\theta)$ is limited. As a result, the rotor angular displacement $\Delta\theta$ is limited. Thus, the second embodiment obtains similar effect of the process of FIG. 10.

In the second embodiment, before determining the conclusive value $\Delta\theta(n)$(conclusion) of the rotor angular displacement (S37), post-limited value $d(\Delta\theta)$(post-limitation) of the rotor angular displacement deviation may be smoothed by the moving average process or the other smoothing process. In the rotor angular displacement calculation unit (angular speed calculation unit) 30, the processes S32 to S36 constitute the filtering unit that is the limitation/smoothing unit.

Described hereinbefore, the embodiments may be modified. For example, instead of the limitation of the rotor angular displacement $\Delta\theta$ in S22 to S24 shown in FIG. 10, smoothing process using, for example, low pass filter, band pass filter, moving average filter or the other filter, may perform. Thus, because the rotor angular displacement $\Delta\theta$ is inhibited from rapid change, if the estimated rotational angle $\theta E$ is inappropriate value, the correction of the addition angle $\alpha$ is inhibited form affect of such inappropriateness so as to perform appropriately. Similarly, instead of the limitation of the rotor angular displacement deviation $d(\Delta\theta)$ in S33 to S36 shown in FIG. 11, smoothing process using, for example, low pass filter, band pass filter, moving average filter or the other filter, may perform. Thus, similar effect may be obtained.

In the above-described embodiments, although the addition angle $\alpha$ is corrected based on not only the rotor angular displacement $\Delta\theta$ but also the torque deviation $\Delta T$, the correction based on the torque deviation $\Delta T$ may be omitted. In detail, the addition angle guard 41 may limit the addition angle $\alpha$ to the range of $(\Delta\theta-A\leq\alpha\leq\Delta\theta+)$ based on the rotor angular displacement $\Delta\theta$.

Further, although the rotor angular displacement $\Delta\theta$ is calculated based on the estimation of the induced voltage in the embodiments, the rotor angular displacement $\Delta\theta$ may be calculated based on the steering angle detected by the steering angle sensor 4.

According to the embodiments, the motor control unit 5 controls the electric motor 3 having the rotor 50 and the stator 55. The current drive unit 31 to 36B drives the motor 3 based on the axis current value $I\gamma^*$ of the rotating coordinate system that rotates in accordance with the control angle $\theta C$ that is the rotational angle of the control. The addition angle calculation unit 22 and 23 calculates the addition angle $\alpha$ to be added to the control angle $\theta C$. The control angle calculation unit 26 calculates the present value of the control angle by adding the addition angle $\alpha$ to the immediately preceding value $\theta C(n-1)$ of the control angle. The angular speed calculation unit 30 calculates the angular speed $\Delta\theta$ of the rotor 50 (S21 and S37), and limits or smoothes the angular speed $\Delta\theta$ (S22 to S26, S32 to S36). The addition angle correction unit 41 corrects the addition angle $\alpha$ based on the angular speed $\Delta\theta$.

In such configuration, while the motor 3 is driven based on the axis current value (imaginary axis current value) $I\gamma^*$ of the rotating coordinate system that rotates in accordance with the control angle $\theta C$ ($\gamma\delta$ coordinate system, imaginary rotating coordinate system), the control angle $\theta C$ is updated by adding the addition angle $\alpha$ every calculation cycle. Thus, updating the control angle $\theta C$, namely, updating the rotating coordinate system (imaginary rotating coordinate system), the motor control unit 5 drives the motor 3 with the imaginary axis current value $I\gamma^*$ so that the motor 3 generates the required torque. Therefore, the motor 3 generates the appropriate torque without using the rotational angle sensor. That is, the deviation (load angle $\theta L$) between the coordinate axis of the rotational coordinate system (dq coordinate system), which extends in the direction of the magnetic poles of the rotor 50, and the imaginary axis is led to the appropriate value, so that the motor 3 generates the appropriate torque.

In the embodiments, the angular speed $\Delta\theta$ of the rotor 50 is calculated by the angular speed calculation unit 30, and then the addition angle $\alpha$ is corrected based on the angular speed $\Delta\theta$. Therefore, the addition angle $\alpha$ is corrected, for example, such that the addition angle $\alpha$ is limited to the appropriate range in accordance with the angular speed $\Delta\theta$ of the rotor 50. As a result, the addition angle $\alpha$ has appropriate value so that the motor 3 is appropriately controlled. The angular speed $\Delta\theta$ is calculated, for example, by subtracting the estimated rotational angle $\theta(n-1)$ in the immediately preceding calculation cycle from the estimated rotational angle $\theta(n)$ in the present calculation cycle.

The angular speed $\Delta\theta$ is further limited or smoothed so that the angular speed $\Delta\theta$ also has appropriate value. Therefore, when, for example, the angular speed $\Delta\theta$ of the rotor 50 is estimated based on the induced voltage of the motor 3, the angular speed $\Delta\theta$ used for correcting the addition angle $\alpha$ is inhibited from being inappropriate value even though the motor current or etc. suddenly changes. As a result, even in the case that the motor current suddenly changes because of the current control or disturbance, the addition angle $\alpha$ is appropriately corrected so that the motor 3 is appropriately controlled.

In the first embodiment, the angular speed calculation unit 30 limits the angular speed $\Delta\theta$ to between the predetermined upper limit Ulim and the predetermined lower limit Llim. Therefore, the addition angle correction unit 41 appropriately performs.

In the second embodiment, the angular speed calculation unit 30 calculates the angular acceleration $d(\Delta\theta)$ of the rotor 50 (S32), and limits or smoothes the angular acceleration $d(\Delta\theta)$ of the rotor 50 (S33 to S36). For example, the angular speed $\Delta\theta(n)$ in the present calculation cycle is calculated by adding the angular acceleration $d(\Delta\theta)$ in the present calculation cycle to the angular speed $\Delta\theta(n-1)$ in the immediately preceding calculation cycle. In such a case, the angular speed calculation unit 30 limits or smoothes the angular speed $\Delta\theta$ by limiting or smoothing the angular acceleration $d(\Delta\theta)$. As a result, the addition angle correction unit 41 appropriately performs.

The angular speed calculation unit 30 may calculate the angular displacement $\Delta\theta$, the value corresponding to the angular speed, of the rotor 50 in the calculation cycle. The angular acceleration calculation unit S32 may calculate the angular displacement deviation $d(\Delta\theta)$, the value corresponding to the angular acceleration, of the rotor 50 in the calculation cycle.

According to the embodiments, the torque that is other than the motor torque and that is applied to the drive target 2 is detected by the torque detection unit 1. Also, the command torque $T^*$ that should be applied to the drive target 2 is set by the command torque setting unit 21. For example, the addition angle calculation units 22 and 23 operate so as to calculate the addition angle $\alpha$ so that the detected torque T that is detected by the torque detection unit 1 coincides with the command torque $T^*$ by the feedback control. Thus, the motor torque is controlled in such a manner that the torque (torque other than the motor torque) corresponding to the command torque $T^*$ is applied to the drive target 2. The motor torque corresponds to the load angle $\theta L$ that is the amount of deviation of the coordinate axis of the rotating coordinate system (dq coordinate system), which extends in the direction of the magnetic poles of the rotor 50, from the imaginary axis. The load angle θL is expressed by the difference between the control angle θC and the rotor angle θM. The motor torque is controlled by adjusting the load angle θL, and the load angle θL, is adjusted by controlling the addition angle α.

In such a case, the command torque T* and the detected torque T are compared with each other, and the addition angle α is adjusted based on the result of comparison. Thus, for example, when the addition angle α that does not conform to the magnitude relationship between the command torque T* and the detected torque T is calculated, it is possible to correct this addition angle α to an appropriate value.

In the embodiments, the motor 3 applies driving power to the steering mechanism 2 of the vehicle. Thus, the vehicle steering apparatus that is the electric power steering apparatus is provided. In this case, the torque detection unit 1 detects the steering torque T that is applied to the steering member 10 for steering the vehicle. The command torque setting unit 21 sets the command steering torque T* that is the target value of the steering torque T. The addition angle calculation unit 22 and 23 calculates the addition angle α in accordance with the deviation ΔT between the command steering torque T* set by the command torque setting unit 21 and the steering torque T detected by the torque detection unit 1.

With this configuration, the command steering torque T* is set, and the addition angle α is calculated based on the deviation ΔT of the steering torque (detected value) T from the command steering torque T*. Thus, the addition angle α is set in such a manner that the steering torque T coincides with the command steering torque T*, and the control angle θC corresponding to the addition angle α is set. Therefore, if the command steering torque T* is appropriately set, an appropriate drive power is generated by the motor 3 and applied to the steering mechanism 2. That is, the amount of deviation (load angle θL) of the coordinate axis of the rotating coordinate system (dq coordinate system), which extends in the direction of the magnetic poles of the rotor 50, from the imaginary axis is brought to a value corresponding to the command steering torque T*. As a result, an appropriate torque is generated by the motor 3, and a drive power that reflects the intention of the driver is applied to the steering mechanism 2.

Preferably, the motor control unit further includes the steering angle detection unit 4 that detects the steering angle of the operation member 10, and the command torque setting unit 21 sets the command steering torque T* based on the steering angle that is detected by the steering angle detection unit 4. With this configuration, because the command steering torque T* is set based on the steering angle of the operation member 10, an appropriate torque corresponding to the steering angle is generated by the motor 3. Therefore, it is possible to bring the steering torque T that is applied to the operation member 10 by the driver to a value corresponding to the steering angle. Thus, it is possible to obtain a good steering feel.

The command torque setting unit 21 may set the command steering torque T* based on the vehicle speed that is detected by the vehicle speed detection unit 6 that detects the speed of the vehicle. With this configuration, because the command steering torque T* is set based on the vehicle speed, it is possible to execute a so-called vehicle speed-sensitive control. As a result, it is possible to obtain a good steering feel. For example, as the vehicle speed increases, that is, as speed at which the vehicle travels increases, the command steering torque T* is set to a lower value. Thus, it is possible to obtain a good steering feel.

Also, in the embodiments described above, the configuration in which a rotational angle sensor is not provided and the motor 3 is driven by executing the sensorless control has been described. Alternatively, the configuration in which a rotational angle sensor, for example, a resolver is provided and the above-described sensorless control is executed when the rotational angle sensor malfunctions may be employed. Thus, even if the rotational angle sensor malfunctions, the motor 3 is continuously driven. Therefore, the steering assist operation is continuously executed.

In this case, when the rotational angle sensor is used, the δ-axis command current value Iδ* is generated by the command current value preparation unit 31 based on the steering torque and the vehicle speed according to the predetermined assist characteristic.

In the embodiments described above, the invention is applied to the electric power steering apparatus. Alternatively, the invention may be applied to a motor control for an electric pump hydraulic power steering apparatus. Further alternatively, the invention may be implemented in various embodiments other than a power steering apparatus. For example, the invention may be applied to a steer-by-wire (SBW) system, a variable gear ratio (VGR) steering system, and a control over a brushless motor provided in another vehicle steering apparatus. The motor control unit according to the invention may be used in a control not only for the vehicle steering apparatus but also for motors for other use.

In addition, various design change may be made within the scope of the claims.

What is claimed is:

1. A motor control unit that is used to control a motor that includes a rotor and a stator that faces the rotor, comprising:
   at least one processor;
   at least one non-transitory computer-readable storage medium, the at least one non-transitory computer-readable storage medium storing instructions that when executed cause the at least one processor to perform as:
   a current drive unit that drives the motor at an axis current value of a rotating coordinate system that rotates in accordance with a control angle that is a rotational angle used in a control and calculated without using an output signal of a rotational angle sensor that detects a rotation angle of the rotor so that the control angle is determined independently from the rotation angle of the rotor;
   an addition angle calculation unit that calculates, without detecting a change of the rotation angle of the rotor, an addition angle that is to be added to the control angle based on a deviation of a control torque calculated by a control torque calculation unit from a command torque set by a command torque setting unit;
   a control angle calculation unit that obtains, at each calculation cycle among a plurality of calculation cycles, a present value of the control angle by adding the addition angle that is calculated by the addition angle calculation unit to an immediately preceding value of the control angle;
   an angular speed calculation unit that calculates an angular speed of the rotor;
   an addition angle correction unit that corrects the addition angle based on the angular speed calculated by the angular speed calculation unit, and
   a filtering unit that filters the angular speed calculated by the angular speed calculation unit.

2. The motor control unit according to claim 1, wherein the filtering unit limits the angular speed to a value between a predetermined upper limit and a predetermined lower limit.

3. The motor control unit according to claim 1, wherein:
the angular speed calculation unit comprises an angular acceleration calculation unit that calculates an angular acceleration of the rotor; and
the filtering unit filters the angular speed by filtering the angular acceleration.

4. The motor control unit according to claim 3, wherein the filtering unit limits the angular acceleration to a value between a predetermined upper limit and a predetermined lower limit.

5. The motor control unit according to claim 3, wherein the angular speed calculation unit obtains, at each calculation cycle, a present value of the angular speed by adding the angular acceleration in the present calculation cycle that is filtered by the filtering unit to an immediately preceding value of the angular speed.

6. The motor control unit according to claim 1, wherein the angular speed calculation unit estimates an induced voltage of the motor, and calculates the angular speed in each calculation cycle based on the estimated induced voltage.

7. The motor control unit according to claim 1, further comprising:
a torque detection unit that detects a torque that is other than a motor torque and that is applied to a drive target that is driven by the motor; wherein
the command torque setting unit sets the command torque that is to be applied to the drive target; and
wherein the addition angle correction unit compares the command torque that is set by the command torque setting unit with the detected torque that is detected by the torque detection unit, and corrects the addition angle based on a result of comparison.

8. The motor control unit according to claim 7, wherein when the addition angle does not conform to a magnitude relationship between the command torque and the detected torque, the addition angle correction unit corrects the addition angle.

9. A vehicle steering apparatus, comprising:
a motor that includes a rotor and a stator that faces the rotor and applies a driving force to a steering mechanism of a vehicle; and
a motor control unit that controls the motor, wherein the motor control unit comprises:
a current drive unit that drives the motor at an axis current value of a rotating coordinate system that rotates in accordance with a control angle that is a rotational angle used in a control and calculated without using an output signal of a rotational angle sensor that detects a rotation angle of the rotor so that the control angle is determined independently from the rotation angle of the rotor;
an addition angle calculation unit that calculates, without detecting a change of the rotation of the rotor, an addition angle that is to be added to the control angle based on a deviation of a control torque calculated by a control torque calculation unit from a command torque set by a command torque setting unit;
a control angle calculation unit that obtains, at each calculation cycle among a plurality of calculation cycles, a present value of the control angle by adding the addition angle that is calculated by the addition angle calculation unit to an immediately preceding value of the control angle;
an angular speed calculation unit that calculates an angular speed of the rotor;
an addition angle correction unit that corrects the addition angle based on the angular speed calculated by the angular speed calculation unit; and
a filtering unit that filters the angular speed calculated by the angular speed calculation unit.

10. The vehicle steering apparatus according to claim 9, wherein the filtering unit limits the angular speed to a value between a predetermined upper limit and a predetermined lower limit.

11. The vehicle steering apparatus according to claim 9, wherein:
the angular speed calculation unit comprises an angular acceleration calculation unit that calculates an angular acceleration of the rotor; and
the filtering unit filters the angular speed by filtering the angular acceleration.

12. The vehicle steering apparatus according to claim 11, wherein the filtering unit limits the angular acceleration to a value between a predetermined upper limit and a predetermined lower limit.

13. The vehicle steering apparatus according to claim 11, wherein the angular speed calculation unit obtains, at each calculation cycle, a present value of the angular speed by adding the angular acceleration in the present calculation cycle that is filtered by the filtering unit to an immediately preceding value of the angular speed.

14. The vehicle steering apparatus according to claim 9, wherein the angular speed calculation unit estimates an induced voltage of the motor, and calculates the angular speed in each calculation cycle based on the estimated induced voltage.

15. The vehicle steering apparatus according to claim 14, further comprising:
a torque detection unit that detects a steering torque that is applied to a steering mechanism by a driver; wherein
the command steering torque setting unit sets the command steering torque that is to be applied to the steering mechanism; and
wherein the addition angle correction unit compares the command steering torque that is set by the command steering torque setting unit with the detected steering torque that is detected by the torque detection unit, and corrects the addition angle based on a result of comparison.

16. The vehicle steering apparatus according to claim 15, wherein when the addition angle does not conform to a magnitude relationship between the command steering torque and the detected steering torque, the addition angle correction unit corrects the addition angle.

* * * * *